United States Patent [19]

Smith

[11] Patent Number: 5,327,066

[45] Date of Patent: Jul. 5, 1994

[54] METHODS AND APPARATUS FOR DISPENSING A CONSUMABLE ENERGY SOURCE TO A VEHICLE

[75] Inventor: Harry F. Smith, Newtown, Conn.

[73] Assignee: Intellectual Property Development Associates of Connecticut, Inc., Trumbull, Conn.

[21] Appl. No.: 66,967

[22] Filed: May 25, 1993

[51] Int. Cl.⁵ .............................................. H02J 7/00
[52] U.S. Cl. ................................... 320/2; 235/381
[58] Field of Search ............... 320/2, 48; 235/381; 194/215, 216, 217, 904

[56] References Cited

U.S. PATENT DOCUMENTS

| | | | |
|---|---|---|---|
| 4,309,644 | 1/1982 | Reimers et al. | 320/2 X |
| 4,347,472 | 8/1982 | Lemelson | 320/2 |
| 4,383,210 | 5/1983 | Wilkinson | 320/2 |
| 4,532,418 | 7/1985 | Meese et al. | 235/381 |
| 4,800,328 | 1/1989 | Bolger et al. | 320/2 |
| 4,861,971 | 8/1989 | Chan | 235/381 X |
| 4,876,540 | 10/1989 | Berthon et al. | 340/932.2 |
| 4,880,097 | 11/1989 | Speas | 194/239 |
| 4,967,895 | 11/1990 | Speas | 194/200 |
| 5,003,520 | 3/1991 | Grieu et al. | 368/90 |
| 5,049,802 | 9/1991 | Mintus et al. | 320/2 |
| 5,157,319 | 10/1992 | Klontz et al. | 320/2 |
| 5,202,617 | 4/1993 | Nor | 320/2 |
| 5,263,565 | 11/1993 | Wilkinson | 320/2 X |

Primary Examiner—Kristine L. Peckman

[57] ABSTRACT

Methods and apparatus are disclosed for dispensing a consumable energy source, such as electrical power or liquid fuel, to a vehicle. A vehicle includes apparatus for coupling the vehicle to a dispenser of the consumable energy source. The vehicle further includes a memory and a coupler for bidirectionally coupling the memory to the dispenser of the consumable energy source for transferring information therebetween. Embodiments of the invention describe the transfer of an indicia from the memory to a remote site for use in accounting for an amount of the consumable energy source that is input to the vehicle. Messages and other information, such as advertisements, can be input to the vehicle while coupled to the dispenser. A display is provided for displaying the information to an operator. A data entry device, such as a keyboard, may also be provided for originating information within the vehicle for transmission to a remote site.

32 Claims, 7 Drawing Sheets

METHODS AND APPARATUS FOR DISPENSING A CONSUMABLE ENERGY SOURCE TO A VEHICLE

FIELD OF THE INVENTION

This invention relates generally to methods and apparatus for dispensing a consumable energy source to a vehicle.

BACKGROUND OF THE INVENTION

Advances in battery technology are expected to provide reliable power sources for electrically operated passenger vehicles. One requirement for such vehicles is the provision of battery recharging apparatus. The recharging of a vehicle's battery when parked at the owner's home may be achieved in a relatively straight forward manner. However, the widespread use of battery powered vehicles necessitates that recharging also be accomplished at other locations. By example, it may often be required to recharge a vehicle's battery while parked at a remote location, such as an office building, factory, hotel, shopping center, airport, or train station. To accomplish recharging of the vehicle's battery at a remote location there must also be provided a reliable and accurate method of accounting for the power consumed in recharging the battery.

In U.S. Pat. No. 4,532,418, entitled "Microprocessor Electric Vehicle Charging and Parking Meter System Structure and Method" Meese et al disclose a system for charging an electric vehicle at a parking location. The system may be operated by a charge card.

Meese et al. do not teach the use of a data entry means, such as a keypad, that permits manual data entry from a user of the battery charger. A manual data entry means would be useful for entering, by example, an account number or an authorization number, such as a Personal Identification Number (PIN). A manual data entry means could also be employed to enter other information, such as a battery type or characteristic. Furthermore, the system of Meese et al. does not appear to require any authorization prior to charging a battery. Instead, this system appears to store credit card charges for subsequent transfer, with a central processor unit validating the customer account number. Furthermore, the teaching of Meese et al. is not seen to permit the use of a card containing a memory device. Instead, this system requires two insertions of a card to achieve proper operation by locking and unlocking the charging cable.

OBJECTS OF THE INVENTION

It is thus one object of this invention to provide an improved method and apparatus for accounting for electrical power consumed in recharging a battery of a battery powered vehicle.

It is another object of this invention to provide a vehicle battery charging system wherein indicia received from a user is transferred to an authorization center for validation, and wherein battery charging is not initiated unless a validation occurs.

It is one further object of this invention to provide a vehicle battery charging system wherein a memory contained within a charge card may be pre-debited by a predetermined amount before a battery charging operation is initiated, wherein only one insertion of the card is required. At the termination of battery charging, the system is enabled to record and/or transmit the appropriate charge to an accounting center.

Another object of this invention is to provide a vehicle battery charging system wherein user specific information, such as accounting-related indicia, is electronically maintained within the vehicle, and wherein the system includes data communications apparatus enabling uni-directional or bi-directional data communications between the vehicle and a charging station.

A still further object of this invention is to provide a fueling system for a vehicle having an internal combustion engine, wherein user specific information, such as accounting-related indicia, is electronically maintained within the vehicle, and wherein the system includes data communications apparatus enabling uni-directional or bi-directional data communications between the vehicle and fueling station.

Another object of this invention is to provide a system having a station for dispensing source of energy to a vehicle, such as electrical energy or a liquid fuel, wherein the system includes data communications apparatus enabling uni-directional or hi-directional data communications between the vehicle and the station.

SUMMARY OF THE INVENTION

The foregoing problems are overcome and the objects of the invention are realized by a battery charging system wherein a battery charging station includes a local controller, a power supply, a card interface device, such as a credit card reader, and a data input terminal. The local controller includes, in one embodiment of the invention, a microprocessor, a timer, and an analog-to-digital (A/D) converter. The microprocessor receives an input from the card reader, an input from the timer, an input from the A/D converter, and an input from the data input terminal. The microprocessor provides an output to a switching device that is employed energize the power supply. During use, a consumer inserts a card having indicia on a surface thereof. The indicia may recorded upon a magnetic stripe or any suitable medium for conveying the user's account number, etc. The card reader senses the indicia and provides a digital output to the microprocessor, the digital output being expressive of the information conveyed by the indicia. The microprocessor is bidirectionally coupled to a central controller for transmitting the indicia information thereto such that power is dispensed and an accounting of the dispensed power is made.

A method for charging a battery of a battery powered vehicle, and apparatus for accomplishing the method, comprises the steps of (a) providing a power supply for dispensing electrical power to a battery of a vehicle; (b) receiving an indicia representative of a monetary value; and (c) responsive to the received indicia representative of a monetary value, enabling the power dispensing means to dispense electrical power. The step of receiving includes a step of detecting data recorded upon a substrate, such as a credit card, or reading and altering a memory device contained within a credit card, or receiving information input by a consumer through a data entry device, such as a keypad. The method includes a further step of generating an indication of an amount of time that the power dispensing means dispenses electrical power. In one embodiment of the invention the method further includes the steps of transmitting the received indicia to an authorization center and receiving an authorization from the authorization center to dispense the electrical power.

In a further embodiment of the invention a vehicle and a station for dispensing a source of energy to the vehicle both include data communications apparatus for enabling uni-directional or bi-directional data communications between the vehicle and the station. User-specific information, such as accounting-related indicia, is electronically maintained within the vehicle and is transmitted to the station prior to and/or subsequent to dispensing the source of energy to the vehicle. The data communications apparatus may be further adapted for entering a communication into the vehicle for display to the operator, the communication including, but not limited to, advertising information and messages. Communications originated by the operator of the vehicle may also be transferred through the data communications apparatus for delivery to a remote location.

Methods and apparatus are disclosed for dispensing a consumable energy source, such as electrical power or liquid fuel, to a vehicle. A vehicle includes apparatus for coupling the vehicle to a dispenser of the consumable energy source. The vehicle further includes a memory and a coupler for bidirectionally coupling the memory to the dispenser of the consumable energy source for transferring information therebetween. Embodiments of the invention describe the transfer of an indicia from the memory to a remote site for use in accounting for an amount of the consumable energy source that is input to the vehicle. Messages and other information, such as advertisements, can be input to the vehicle while coupled to the dispenser. A display is provided for displaying the information to an operator. A data entry device, such as a keyboard, may also be provided for originating information within the vehicle for transmission to a remote site.

BRIEF DESCRIPTION OF THE DRAWING

The foregoing and other features of the invention are made more apparent in the ensuing Detailed Description of the Invention, when read in conjunction with the attached Drawing, wherein:

FIG. 1b is a block diagram illustrating in greater detail one of the charging stations of FIG. 1a;

FIG. 2b is a block diagram illustrating in greater detail the battery charging station of FIG. 2a;

FIG. 4 is a flowchart illustrating the operation of the central controlling station of FIG. 1a;

DETAILED DESCRIPTION OF THE INVENTION

Figure 1A:
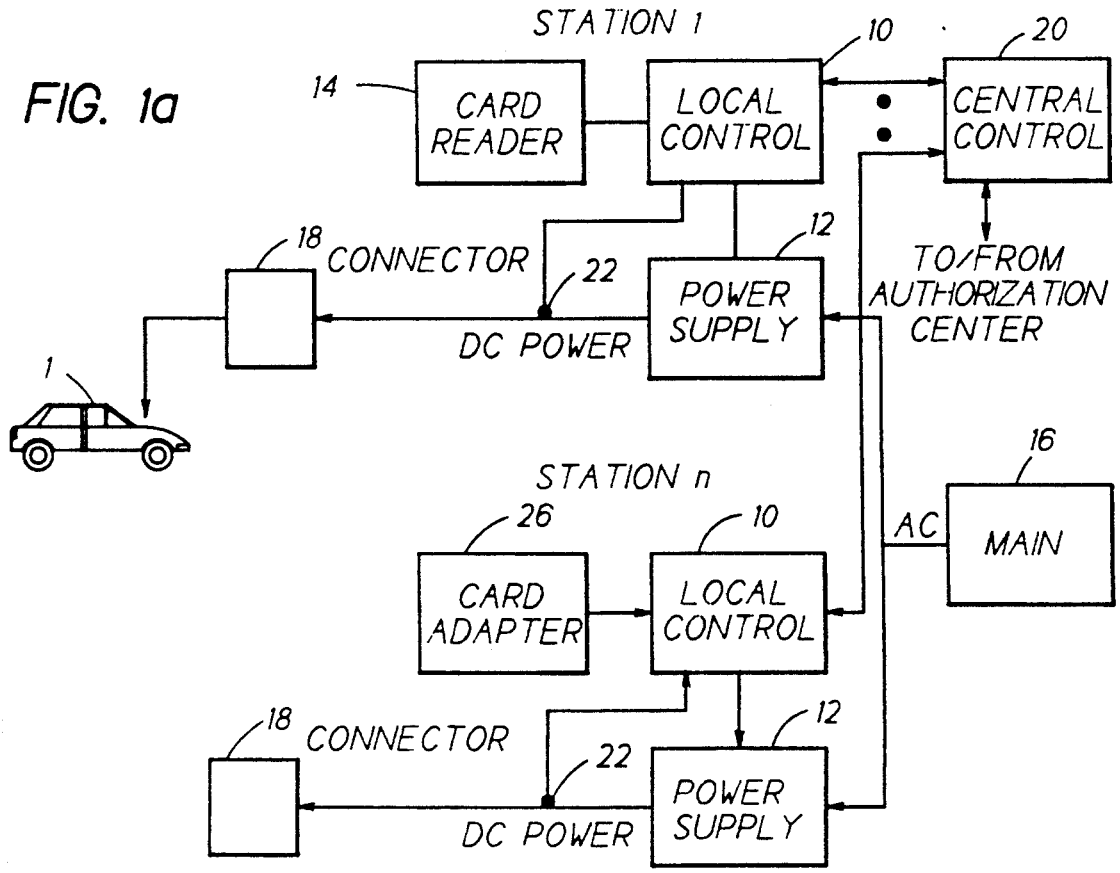
FIG. 1a is a block diagram illustrating the use of a plurality of battery charging stations, wherein indicia received from a consumer-provided card is transmitted to a central controlling station.

Referring to FIGS. 1a, 1b, 3 and 4 there is described a first embodiment of the invention. A plurality of battery charging stations, designated Station 1 to Station n, each include a local controller 10, a power supply 12, and a card reader 14. Each power supply 12 receives an AC power input from a main 16. The power supply 12 includes a transformer 12a and a DC power supply 12b. The output of power supply 12 has a voltage potential suitable for recharging a battery within a vehicle 1. A suitable connector 18 is provided for coupling to the battery terminals of the vehicle 1.

The local controller 10 includes a microprocessor 10a, a timer 10b, and an analog-to-digital (A/D) converter 10c. Microprocessor 10a receives an input from the card reader 14, an input from the timer 10b, and an input from the A/D 10c. The microprocessor 10a provides an output to a switching device, such as a relay 12c, that is employed to open and close the transformer 12a circuit. During use, a consumer inserts a card 2 having indicia 3 on a surface thereof. The indicia may be recorded upon a magnetic stripe, a bar code, a series of punched-out openings, or any suitable medium for conveying the user's account number and possibly other information. The card reader 14 senses the indicia 3 and provides an output to the microprocessor 10a, the output being expressive of the information conveyed by the indicia 3. The microprocessor 10a is bidirectionally coupled to a central controller 20 for transmitting the indicia information thereto.

Figure 3:
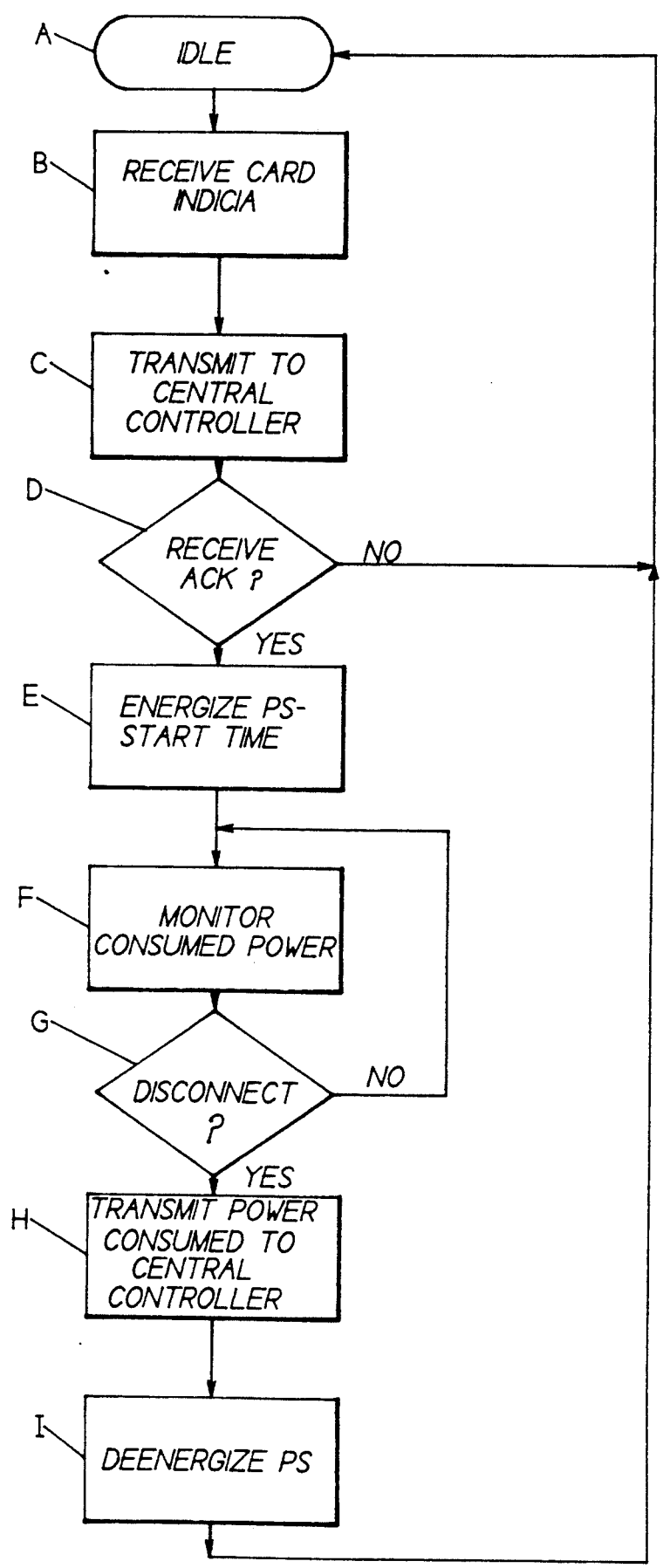
FIG. 3 is a flow chart illustrating the operation of one of the battery charging stations of FIGS. 1a and 1b.

Referring to FIG. 3, in response to the receipt of the digital signal from the card reader 14 the microprocessor 10a exits an IDLE state (A) and receives the digital signal (B). At block C the microprocessor transmits a digital signal to the central controller 20, the digital signal being expressive of information conveyed by the indicia 3.

Figure 4:
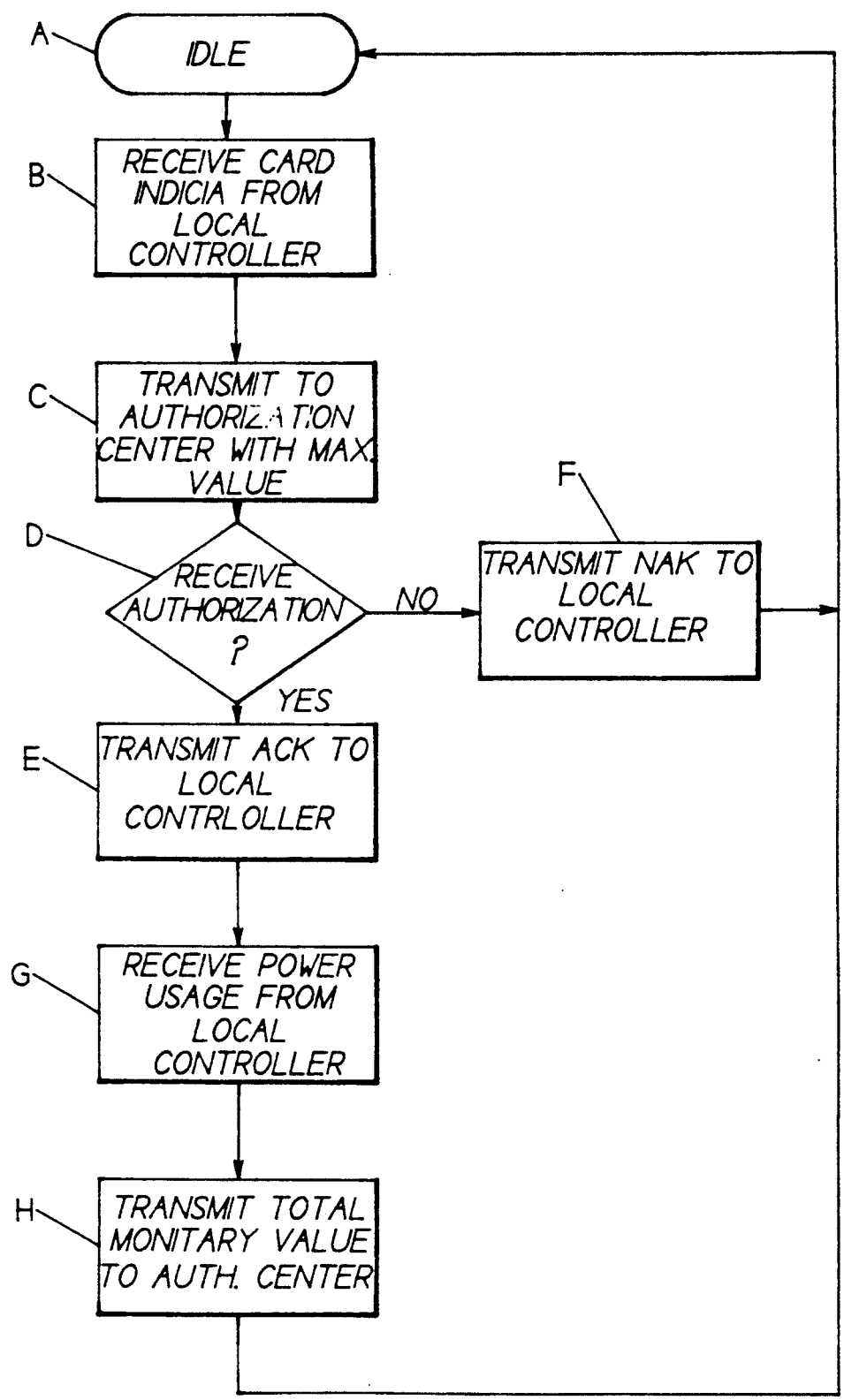

Referring to FIG. 4, in response to the transmission of the indicia information from the microprocessor 10a the central controller 20 exits an idle state (Block A) and receives the card indicia information from the microprocessor 10a (Block B). The central controller 20 transmits the indicia information to a remote authorization center. The central controller 20 may also transmit a maximum monetary value that the consumer will be expected to expend (Block C). The central controller 20 then waits to receive an authorization from the authorization center. If the authorization is received (Block D) the central controller 20 transmits an acknowledge (ACK) signal to the microprocessor 10a of the charging station (Block E). If the authorization is not received the central controller transmits a no acknowledge (NAK) signal to the local controller (Block F) and re-enters the idle state (A).

Returning to the flow chart of FIG. 3, the local controller 10 waits to receive the ACK (Block D) from the central controller 20. If the NAK signal is received instead the local controller 10 re-enters the idle state at Block A and no power is dispensed to the consumer. If the ACK signal is received the microprocessor 10a closes relay 12c so as to energize the DC power supply 12b (Block E). The microprocessor 10a also initiates timer 10b so as to record an amount of time that the power supply 12b is energized. The microprocessor 10a then monitors the power utilized by the consumer. To this end a suitable means is connected to the output of the power supply 12 so as to monitor the current flow from the DC power supply 12b. For example, an inductive pickup 22 may be provided adjacent the power leads, the output of the pickup 22 being indicative of the power flowing through the power leads. A low value resistance may also be inserted in series with a power lead and the voltage potential appearing across the resistance may be measured to obtain an indication of the charging current. It is also within the scope of the invention to instead meter the AC power at the input to the DC power supply 12b. The DC power supply 12b may be embodied within a linear power supply, a switching power supply, or any suitable AC/DC conversion apparatus. If a switching supply is used, the transformer 12a may be eliminated and the switching supply connected directly to the AC power input through a switch controlled by the microprocessor 10a.

For any of these various embodiments an analog signal indicative of the power consumed in recharging the vehicle's battery is converted, by the A/D 10c, to a digital reading that is input to the microprocessor 10a.

It should be realized that in these various embodiments of the invention AC power may be dispensed and metered, instead of DC power, if the vehicle is equipped with a suitable AC/DC converter.

In addition to monitoring the power usage of Block F, the microprocessor 10a operates at Block G to sense a disconnect condition wherein the vehicle battery is disconnected from the connector 18. This can be sensed, by example, by the current going to zero or the voltage rising to an open circuit value. So long as the disconnect is not sensed at Block G the microprocessor 10a continues to monitor the power usage at block F. When the disconnect is sensed at block G the microprocessor 10a transmits a signal to the controller 20, the signal indicating a total amount of power consumed (Block H). The microprocessor 10a then de-energizes the D/C power supply 12b by opening relay 12c (Block I) and reenters the idle state (Block A).

Referring again to FIG. 4, the central controller 20 receives, at Block G, the power usage signal from the microprocessor 10a of the local controller 10. Responsive thereto the central controller 20 transmits to the authorization or accounting center a signal indicative of a total monetary value that is to be charged to the consumer's account (Block H). Other charges may also be incurred in addition to the charge for the dispensed power. By example only, a usage fee or a parking fee may be added. The central controller 20 then reenters the idle state at Block A.

The timer 10b serves a dual function. The output of the timer 10b enables the microprocessor 10a to determine the total Watt-hours of electrical power that are consumed in charging the vehicle's battery. The timer 10b also indicates the amount of time that the vehicle 1 is connected to the charging station. For some applications it may be desirable to also bill the consumer for the amount of time that the vehicle 1 is connected. This may be especially advantageous when the vehicle 1 is connected for a significant period of time beyond what is required to fully charge the battery. For example, if the charging station is located in an airport parking lot the vehicle 1 may be connected for several days or even weeks to the charger, even though during a significant portion of this time only a trickle charge is being applied to the vehicle's battery. For this case, it may be advantageous to also bill the consumer for "connect time", that is, to bill the consumer at an hourly or daily rate, regardless of the amount of power actually being consumed.

The card 2 presented by the consumer may be a conventional credit card. The card 2 may also be an Automatic Teller Machine (ATM) card, in which case the billed amount may be debited from a corresponding bank account maintained by the consumer. Also, the card 2 presented by the consumer may be a card especially issued to the consumer solely for the purpose of recharging the battery within the consumer's vehicle. That is, an electric utility may issue the card and the recorded charges may appear on the consumer's monthly statement. Alternatively, an organization that installs and maintains the charging stations may issue the card to the consumer, and subsequently bill the consumer for consumed power.

As employed herein an indicia representative of a monetary value is intended to encompass information recorded upon a substrate, such as a credit card; a bank account number recorded upon an ATM card; data stored within a memory device of a credit card or a memory device of the vehicle itself; an account number or an authorization number directly input by a consumer via a data entry device, such as a keypad or the like; and any other information that enables an account associated with a consumer to be charged or debited.

Figure 1B:
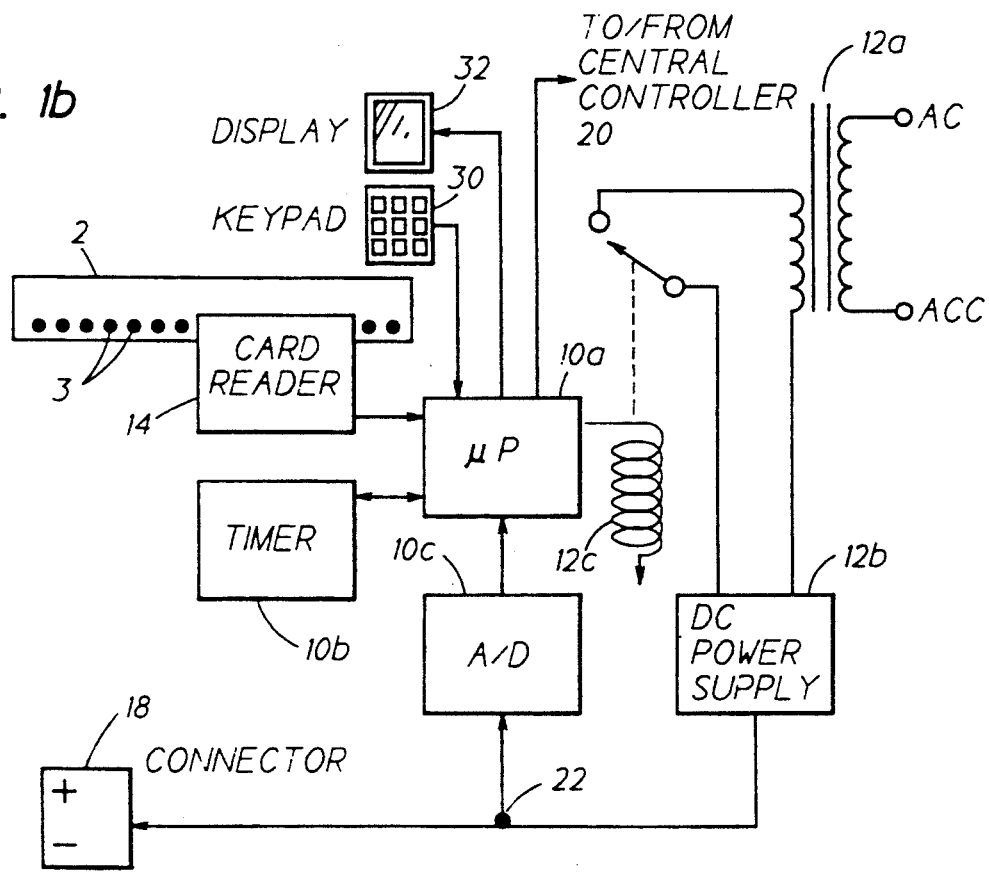
Figure 2A:
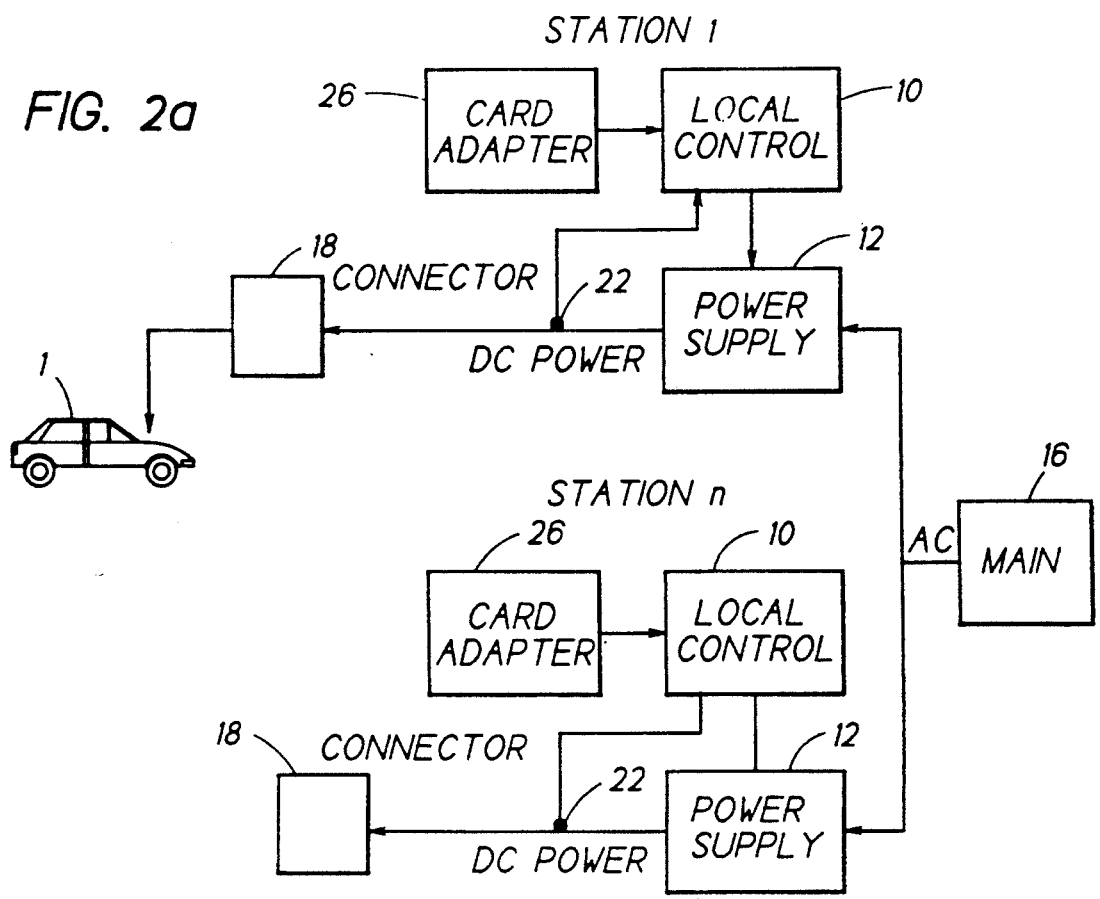
FIG. 2a is a block diagram of another embodiment of the invention wherein a battery changing station debits a monetary balance stored within a consumer-provided card.
Figure 2B:
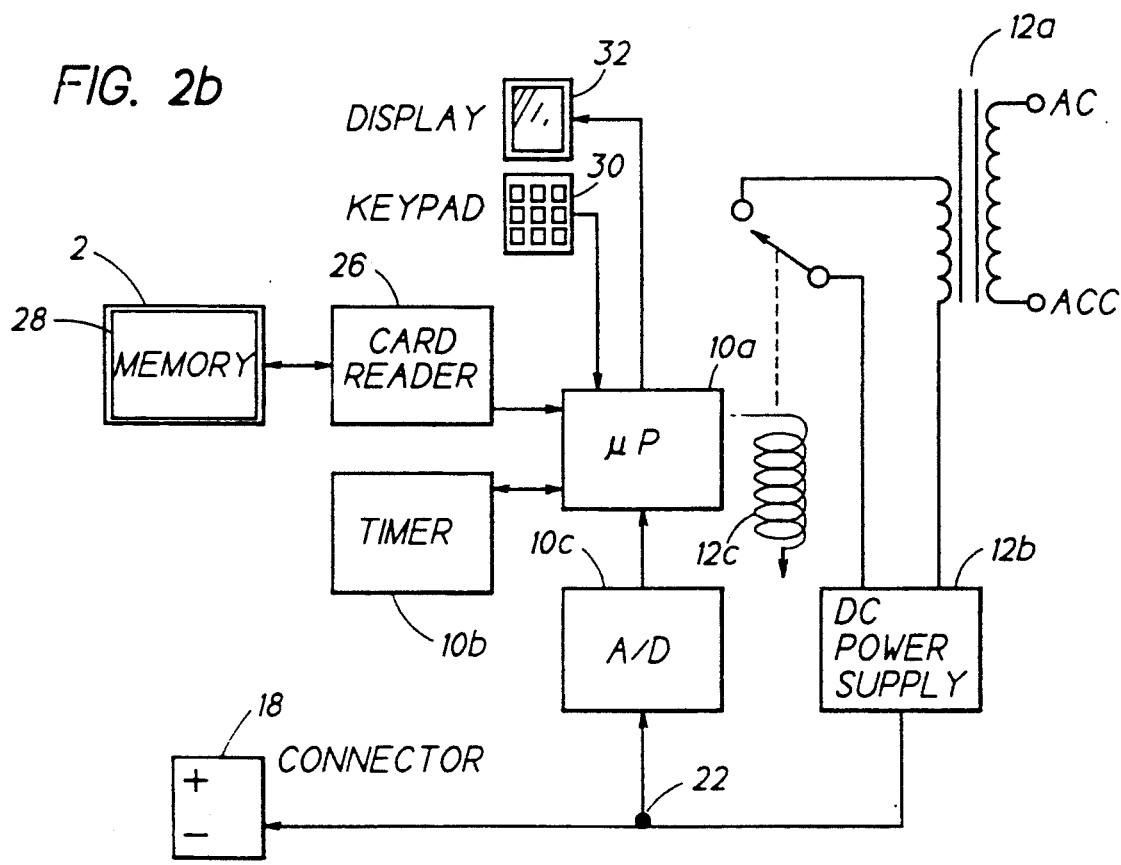

Referring now to FIGS. 2a and 2b there is illustrated a further embodiment of the invention, wherein components found also FIGS. 1a and 1b are numbered accordingly. In this embodiment of the invention each of the plurality of charging stations includes a card adapter 26. For this embodiment the local controller 10 is not required to be coupled to a central controller 20 or to an authorization center, in that the local controller 10 directly debits a monetary value stored within a memory 28 that is contained within the consumer's card 2. This embodiment of the invention is suited for use in, but not limited to, an application wherein a predetermined amount of power is provided to the consumer. That is, the local controller 10 initially debits the consumer's card by some predetermined monetary value, prior to dispensing power. When the microprocessor 10a determines that the billed amount of power has been consumed, the microprocessor 10a deactivates the DC power supply.

Figure 5:
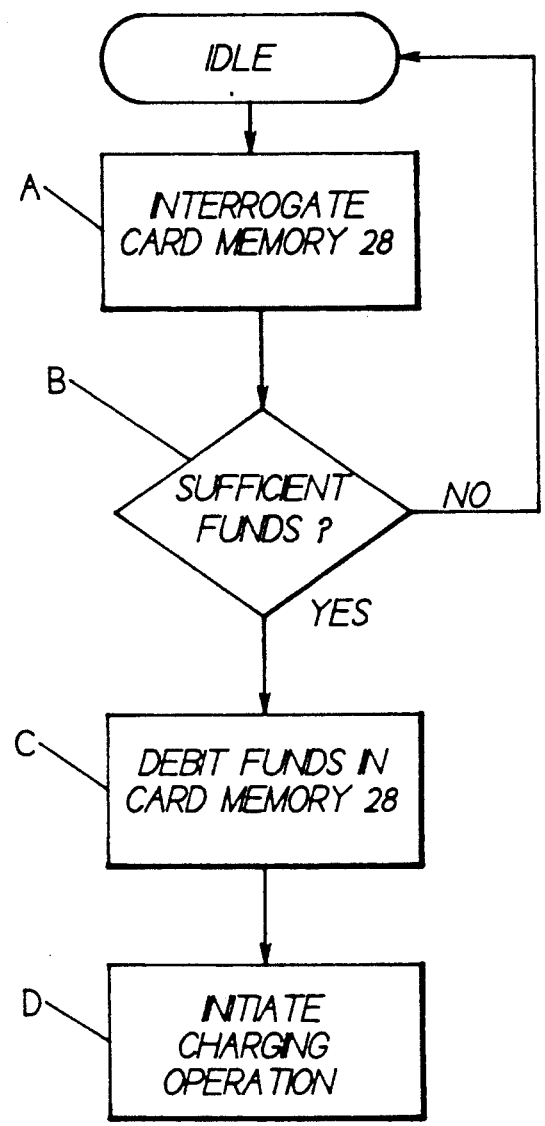
FIG. 5 is a flowchart illustrating the operation of the battery charging station of FIG. 2b.

In operation, and referring to FIG. 5, the microprocessor 10a interrogates the card memory 28 (Block A) to determine if the stored balance is at least equal to the amount to be debited (Block B). If this condition is satisfied, the microprocessor 10a debits the memory by the required monetary value (Block C) and initiates the charging operation (Block D). Pre-billing the consumer is desirable in that the consumer may purposely or inadvertently disconnect the charging station from the vehicle's battery, without also inserting the card into the card adapter 26. It is within the scope of the invention to consolidate the functionality of the plurality of local controllers 10, in particular the microprocessors 10a, into the central controller 20. For this embodiment each STATION includes a card interface device, such as the card reader 14 or card adapter 26, and also, preferably, the power supply 12. The central controller 20 is responsible for receiving input from the various card interfaces and for remotely activating the associated DC power supplies 12 to dispense power. For installations spread over a considerable distance the DC power supply 12 is preferably provided within each local STATION so as to reduce voltage drops between a centrally located power supply and the battery terminals. However, for small installations comprising a few stations in close proximity, wherein the DC voltage drops are not excessive, the central controller 20 may also include one or more of the DC power supplies. In one still further embodiment of the invention the central controller may be eliminated altogether, with each local controller communicating directly with the credit card authorization center, or operating autonomously to debit the consumer's balance within the card memory. Another embodiment includes one or more card interface devices in association with the central controller 20, and not the local controller 10. A still further embodiment of the invention provides a data entry device, such as a keypad 30 (FIG. 1b), at each local STATION or at the central controller 20 whereby a consumer is enabled to enter a personal or an organizational account code against which a monetary charge is to be made. The data entry device may also be employed to enter other information, such as a type of battery that is installed within the vehicle so that, by example, the voltage level or the battery charging rate may be set by the local or the central controller. A data output device, such as an LCD display 32 (FIG. 1b), may also be employed for communicating information to the consumer, such as instructions or an indication of the amount of money to be charged to the consumer.

Figure 6:
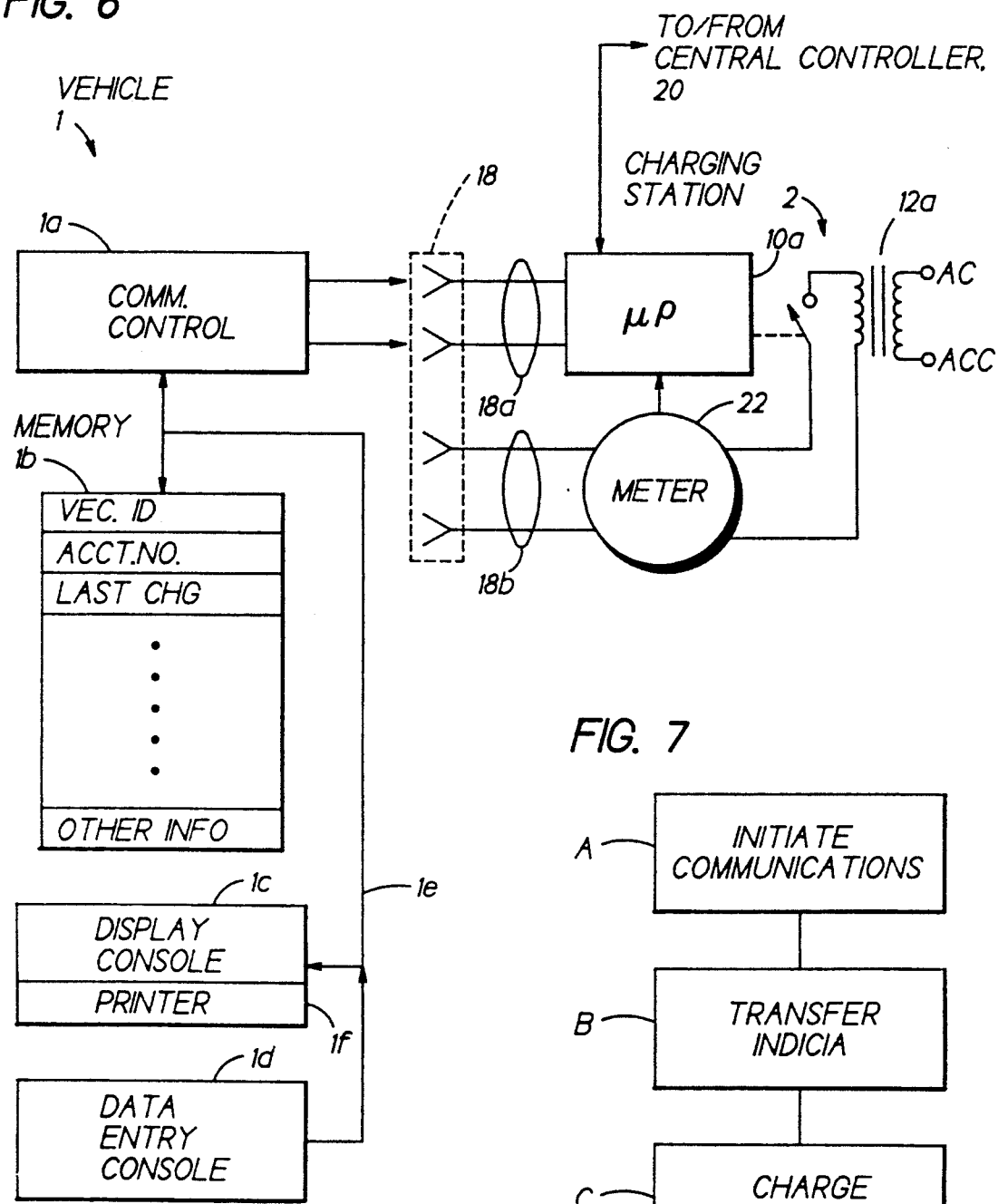
FIG. 6 is a block diagram illustrating a battery charging station and a vehicle, wherein information is transferred between the vehicle and the battery charging station.
Figure 7:
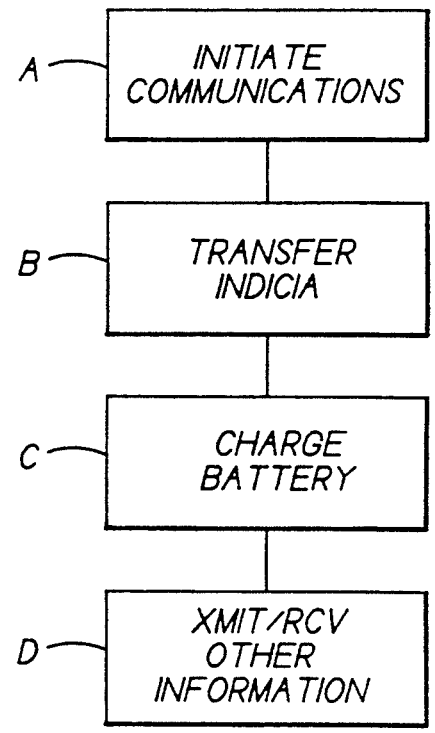
FIG. 7 is a flowchart illustrating the operation of the battery charging station and vehicle of FIG. 6.

In a still further embodiment of the invention, and referring to FIGS. 6 and 7, a battery charging station and a vehicle are provided wherein information is transferred between the vehicle and the battery charging station.

In this embodiment of the invention, the connector 18 includes a data communications portion 18a and a power dispensing portion 18b. AC power is dispensed from the transformer 12a, and a meter 22 provides an indication of the dispensed power to the microprocessor 10a. The data communications portion 18a of the connector 18 is coupled to the microprocessor 10a. The vehicle 1 includes a communication controller 1a that is coupled to the microprocessor 10a through the data communications portion 18a of the connector 18. The vehicle 1 also includes a memory 1b that stores user-specific information. The user specific information includes a vehicle identification (VEC. I.D.) and, for example, an account number (ACCT. NO.). The memory 1b may also store other information, such as information relating to a last charging operation (LAST CHG), with which the communications controller 1a is enabled, in conjunction with an odometer reading and the current charging information, to monitor the energy efficiency of the vehicle 1. To this end the vehicle may also include a display console 1c, such as an LCD display or a video monitor, which is used to display the energy usage and efficiency to the user. The vehicle may also include a data entry console 1d. A bus 1e couples together the communications controller 1a, memory 1b, display console 1c and data entry console 1d. The data entry console 1d can be employed by the user to initiate a transfer of information from the vehicle 1 to the charging station 2, such as a transfer of the ACCT. NO. Alternately, this transfer can be accomplished automatically by the communications controller 1a in concert with the microprocessor 10a.

Referring to FIG. 7, at Block A the user connects the vehicle 1 to the charging station 2. Responsive to the connection, communications are initiated by the microprocessor 10a by interrogating the communications controller 1a for the ACCT. NO. information stored in the memory 1b. The VEC. I.D., and also optional other information, may be transferred from the vehicle 1 to the charging station 2 via the data communications portion 18a of the connector 18 (Block B). In response to the received indicia, the microprocessor 10a communicates with the central controller 20 to verify the ACCT. NO. Assuming that the ACCT. NO. is verified, the microprocessor 10a activates the transformer 12a, the battery of the vehicle 1 is charged, and the meter 22 is read to obtain an indication of the dispensed power (Block C). An accounting is then made in cooperation with the previously received indicia. At the completion of the charging cycle, the communications controller 1a is enabled to determine the energy efficiency of the vehicle, based on information received from the microprocessor 10a and internal odometer readings. In this manner the communications controller 1a is enabled to detect abnormal battery or vehicle conditions. Any pertinent information can be displayed to the user through the use of the display console 1c. The communications controller 1a then updates the LAST CHG information stored within the memory 1b. At Block D, an optional step of transferring other information is executed, it being realized that Block D may be executed prior to the completion of the battery charging operation.

The execution of Block D enables a number of valuable operations to be performed. One operation enables the central controller 20 to transmit unsolicited or solicited advertisements to the vehicle 1 for display on the display console 1c. By example, the names of lodgings, restaurants, and/or recreational areas within a predetermined radius of the charging station 10 can be displayed to the user. In response, the user can employ the data entry console 1d to make further inquiries as to location, rates, etc. Further by example, using predetermined keystrokes the user can reserve a room at a selected lodging, and can initiate a transfer of the stored ACCT. NO., or another account number, to be relayed to the selected lodging via the microprocessor 10a and the central controller 20. A confirmation number may then be relayed from the selected lodging, via the central controller 20, to the vehicle 1 for display on the display console 1c. An optional printer device 1f can also be employed to provide a hard copy of the confirmation number, and/or to provide a copy of addresses, rates, billing information, etc. The optional printer device 1f may also be employed to provide the user with discount coupons, advertising literature, the location of and distance to other charging stations, etc.

Another operation that is enabled by the execution of Block D is the transmission and/or reception of other information in the form of messages. For example, a party wishing to contact an occupant of the vehicle 1 transfers a message to the central controller 20, the message including the VEC. I.D., the ACCT. NO., or some other identifying information. The message and identifying information is stored within the central controller 20. The other identifying information can include, by example, the vehicle's license plate number, the name of the driver, a telephone number, or the name of a passenger. In this regard, the vehicle operator can manually enter other identifying information into the memory 1b with the data entry console 1d. By example, before beginning a journey the operator can enter the names of any passengers into the memory 1b.

In response to receiving the message, the central controller 20 monitors incoming communications from charging stations 20 to identify a transmission from the vehicle to which the stored message is directed. When operating in this mode the communications controller 1a transfers all identification-related information from the memory 1b to the central controller 20, via the microprocessor 10a. When the central controller 20 identifies a transmission from the vehicle having the stored message, the central controller transfers the stored message to the vehicle 1 for display and optional printing. An acknowledgement signal may be automatically or manually generated within the vehicle for transmission back to the central controller 20.

If the central controller 20 determines that a last charging operation was accomplished at a charging station within a predetermined distance from a periphery of an area served by the central controller 20, the central controller may 20 may relay the stored message to another central controller within an adjacent area. In this manner the message can be relayed to one or more additional central controllers for eventual delivery to the vehicle 1. In like manner an acknowledgement signal can be relayed back to the originating central controller.

Initiating a message within the vehicle 1 is accomplished by the operator employing the data entry console 1d to enter a message and an address of the message destination, such as telephone number or the identification of another vehicle. The message and identifying information are temporarily stored in the memory 1b. During a next charging operation the stored message information is relayed from the communications controller 1a, via the microprocessor 10a, to the central controller 20 for delivery. If delivery is accomplished during the charging operation, then an acknowledgment signal may be transferred immediately back to the vehicle 1 for display to the operator. If message delivery is delayed, then the acknowledgment signal is stored within the central controller 20 for delivery to the vehicle 1 during a next charging operation at another charging station.

Figure 8:
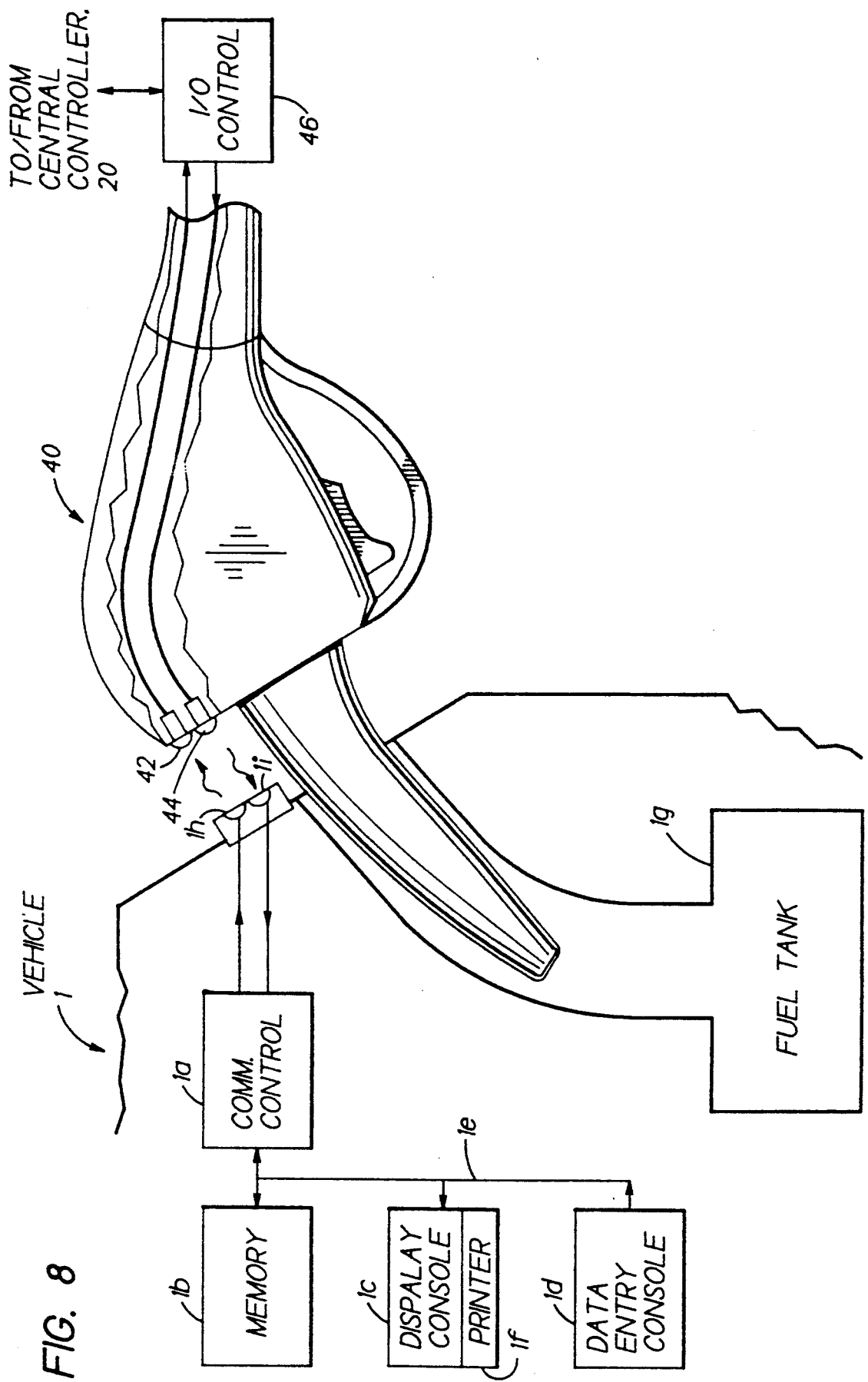
FIG. 8 is a block diagram illustrating a fueling station and a vehicle, wherein information is transferred between the vehicle and the fueling station.

FIG. 8 illustrates the teaching of this invention as applied to a fueling station for a vehicle 1 having an internal combustion engine and a fuel tank 1g. In this embodiment of the invention the direct electrical connection provided by the data communications portion 18a of connector 18 is eliminated, and replaced with an optical, infrared (IR) radiation data link. To this end a fuel nozzle 40 includes an IR receiver 42 and an IR transmitter 44 that provide bidirectional data communications with corresponding IR transmitter 1h and IR receiver 1i. IR transmitter and receiver 1h and 1i are positioned on the vehicle 1, with respect to the normal position of the nozzle 40 during a fueling operation, so as to enable bidirectional bit serial data communications between communications controller 1a and an I/O controller 46 located at, or near to, the fuel pump. I/O controller 46 is in bidirectional communication with the central controller 20, as in the embodiment of FIG. 6.

The vehicle 1 includes the memory 1b, display console 1c, data entry console 1d, bus 1e, and optional printer 1f, and operates as described above with respect to the flow chart of FIG. 7, with modifications being made for dispensing a liquid fuel instead of electrical power. That is, account number information is automatically transferred between the vehicle 1 and the remote controller 20 during a fueling operation. The fueling station also transmits an amount of liquid fuel that is provided to the fuel tank 1g. Other information can also be transferred, such as advertisements, lodging information, confirmations, and messages to or from an occupant of the vehicle.

It can be realized that the interconnection between the vehicle 1 and the charging station 2 may be provided in a number of suitable embodiments, including a low power RF link and an inductive transmitter and receiver. The use of a wireless connection, as opposed to a direct electrical connection, is preferred in the embodiment of FIG. 8 to avoid a possibility of generating a spark during the coupling and uncoupling of the nozzle 40, and also to accommodate the various positions that the nozzle 40 may assume during the fueling operation.

Based upon the foregoing description of several embodiments of the invention, those having skill in the art may derive modifications to these embodiments. This invention should therefore not be construed to be limited only to the specific embodiments described above, but instead is intended to be given a scope commensurate with the claims that follow.

What is claimed is:

1. A battery charging system for use with electrically powered vehicles, the system comprising:

a plurality of battery charging stations, each of said battery charging stations including, means for dispensing electrical power to a battery of an electrically powered vehicle;

means for receiving an indicia that includes information representative of a value, said receiving means including means for coupling to a memory device that is located within the electrically powered vehicle for receiving the indicia therefrom, the indicia being stored within the memory device, said indicia further including information for uniquely identifying the electrically powered vehicle; and local control means having an output coupled to said electrical power dispensing means for enabling and disabling an operation thereof, said local control means further having a first input coupled to an output of said receiving means for receiving said indicia therefrom;

said system further including central control means that is bidirectionally coupled to each of said local control means for receiving said indicia therefrom and for transmitting an enabling signal thereto, said central control means further being bidirectionally coupled to a further control means, said central control means including means for transmitting said indicia to said further control means for verification and for receiving an acknowledging signal therefrom in response to said indicia being verified by said further control means, said central control means further including means for generating said enabling signal and for transmitting said enabling signal to one of said local control means in response to a receipt of said acknowledging signal from said further control means, and wherein each of said local control means enables said electrical power dispensing means to dispense an amount of the electrical power to the battery of an electrically powered vehicle only in response to a receipt of said enabling signal from said central control means.

2. A battery charging system as set forth in claim 1 wherein each of said battery charging stations further includes data entry means operable for manually inputting information from a user of said battery charging station, an output of said data entry means being coupled to a second input of an associated one of said local control means for supplying user-generated data to said associated one of said local control means.

3. A method for charging a battery of an electrically powered vehicle, comprising the steps of:
providing means for outputting electrical power to a battery of a vehicle;
coupling the battery to said electrical power outputting means;
receiving information that is stored within a memory device of the vehicle, the received information including an indicia that is representative of a monetary value;
verifying a validity of the indicia that is included within the received information by transmitting the indicia to a remote verification means;
responsive to the received indication, enabling said electrical power outputting means to output the electrical power;
monitoring said electrical power outputting means to detect a condition wherein the battery is uncoupled from said electrical power outputting means;
responsive to a detection of the battery being uncoupled, disabling the operation of said electrical power outputting means;
determining a monetary value of the electrical power that was outputted to the battery of the vehicle; and
transmitting the determined monetary value to a remote accounting means for accounting in accordance with the indicia;
wherein the step of enabling includes a step of initiating an operation of a timer means, wherein the step of disabling terminates the operation of said timer means, and wherein the step of determining a monetary value takes into account an elapsed time that is indicated by said timer means.

4. A method for inputting a consumable energy source into a vehicle, comprising the steps of:
coupling the vehicle to a means for inputting a consumable energy source into the vehicle;
transferring indicia from a memory, located within the vehicle, to the inputting means, the indicia including information for identifying the vehicle or an occupant of the vehicle;
receiving the transferred indicia; and
accounting, in cooperation with the transferred indicia, for an amount of the consumable energy source that is input into the vehicle.

5. A method for dispensing a consumable energy source to a vehicle, comprising the steps of:
coupling the vehicle to a means for dispensing a consumable energy source;
transferring indicia from a memory, located within the vehicle, to the dispensing means;
receiving the transferred indicia;
accounting, in accordance with the transferred indicia, for an amount of the consumable energy source that is input into the vehicle; and
transferring information from the dispensing means to the memory, the transferred information being descriptive of at least an amount of the consumable energy source that is input into the vehicle.

6. A method as set forth in claim 4 wherein the steps of transferring and receiving are accomplished through an electrical connection that is established during the step of coupling.

7. A method as set forth in claim 4 wherein the steps of transferring and receiving are accomplished through a wireless connection that is established during the step of coupling.

8. A method for dispensing a consumable energy source to a vehicle, comprising the steps of:
coupling the vehicle to a means for dispensing a consumable energy source;
transferring indicia from a memory, located within the vehicle, to the dispensing means;
receiving the transferred indicia;
accounting, in accordance with the transferred indicia, for an amount of the consumable energy source that is input into the vehicle; and
transferring information from a remote site to the memory through the dispensing means.

9. A method for dispensing a consumable energy source to a vehicle, comprising the steps of:
coupling the vehicle to a means for dispensing a consumable energy source;
transferring indicia from a memory, located within the vehicle, to the dispensing means;
receiving the transferred indicia;
accounting, in cooperation with the transferred indicia, for an amount of the consumable energy source that is input into the vehicle; and, while the vehicle is coupled to the dispensing means,
transferring a message from a remote site to the memory through the dispensing means.

10. A method for dispensing a consumable energy source to a vehicle, comprising the steps of:
coupling the vehicle to a means for dispensing a consumable energy source;
transferring indicia from a memory, located within the vehicle, to the dispensing means;
receiving the transferred indicia;
accounting, in cooperation with the transferred indicia, for an amount of the consumable energy source that is input into the vehicle; and, while the vehicle is coupled to the dispensing means,
transferring a message from the memory to a remote site through the dispensing means.

11. A method as set forth in claim 8, and further including a step of displaying, within the vehicle, the transferred information.

12. A method as set forth in claim 8, and further including a step of generating, within the vehicle, a hard copy of the transferred information.

13. A method as set forth in claim 9, and further including a step of displaying, within the vehicle, the transferred message.

14. A method as set forth in claim 9, and further including a step of transmitting a message acknowledgement signal from the vehicle to the remote site through the dispensing means.

15. A method as set forth in claim 9, and further including a step of generating, within the vehicle, a hard copy of the transferred message.

16. A method as set forth in claim 10, and including the initial steps of:
entering the message with a data entry means located within the vehicle; and storing the entered message within the memory.

17. A system for inputting a consumable energy source into a vehicle, comprising:
 means for inputting a consumable energy source into a vehicle;
 means for coupling the vehicle to the means for inputting the consumable energy source;
 means for transferring indicia from a memory, located within the vehicle, to the inputting means, the indicia including information for identifying the vehicle or an occupant of the vehicle;
 means for receiving the transferred indicia; and
 means for accounting, in cooperation with the transferred indicia, for an amount of the consumable energy source that is input into the vehicle.

18. A vehicle, comprising:
 means for coupling the vehicle to a means for dispensing a consumable energy source to the vehicle;
 memory means within the vehicle; and
 means for bidirectionally coupling said memory means to the means for dispensing the consumable energy source for transferring information between said memory means and said means for dispensing the consumable energy source, wherein the transferred information includes information that uniquely identifies the vehicle.

19. A vehicle as set forth in claim 18 wherein said coupling means is comprised of an electrical connector.

20. A vehicle as set forth in claim 18 wherein said coupling means is comprised of an optical transmitter means and an optical receiver means.

21. A vehicle comprising:
 means for coupling the vehicle to a means for dispensing a consumable energy source to the vehicle;
 memory means;
 means for bidirectionally coupling said memory means to the means for dispensing the consumable energy source for transferring information therebetween; and
 display means for displaying information received from the means for dispensing the consumable energy source.

22. A vehicle comprising:
 means for coupling the vehicle to a means for dispensing a consumable energy source to the vehicle;
 memory means;
 means for bidirectionally coupling said memory means to the means for dispensing the consumable energy source for transferring information therebetween; and
 means for generating a hard copy of information received from the means for dispensing the consumable energy source.

23. A vehicle comprising:
 means for coupling the vehicle to a means for dispensing a consumable energy source to the vehicle;
 memory means;
 means for bidirectionally coupling said memory means to the means for dispensing the consumable energy source for transferring information therebetween; and
 data entry means for entering information into said memory means for transfer to the means for dispensing the consumable energy source.

24. A vehicle comprising:
 means for coupling the vehicle to a means for dispensing a consumable energy source to the vehicle;
 memory means;
 means for bidirectionally coupling said memory means to the means for dispensing the consumable energy source for transferring information therebetween; and
 means for transmitting an acknowledgement signal in response to information received from the means for dispensing the consumable energy source.

25. A method for delivering a message to an occupant of a vehicle, comprising the steps of:
 storing a message, the message including information for specifying a destination for the message;
 in response to a vehicle being coupled to a dispenser of a consumable energy source, receiving information from a memory device within the vehicle, the received information identifying the vehicle or an occupant of the vehicle;
 comparing the received information to the stored information identifying the destination of the message; and
 if the received information is equal to the stored information identifying the destination of the message, transferring the stored message to the vehicle through the dispenser of the consumable energy source.

26. A method as set forth in claim 25, and further including a step of presenting the message within the vehicle.

27. A method as set forth in claim 25, and further including the steps of:
 generating a message acknowledgement signal within the vehicle; and
 transferring the message acknowledgement signal through the dispenser of the consumable energy source.

28. A system for delivering a message to a vehicle, comprising:
 a vehicle that includes a memory device for storing information;
 means for storing a message, the message including information for specifying a destination for the message;
 means for outputting a consumable energy source to the vehicle, said outputting means including means for receiving information from the memory device within the vehicle, the received information identifying the vehicle or an occupant of the vehicle;
 means for comparing the received information to the stored information that identifies the destination of the message; and
 means, responsive to said comparing means indicating that the received information is equal to the stored information that identifies the destination of the message, for transferring the stored message to the vehicle through said means for outputting the consumable energy source.

29. A system as set forth in claim 28, wherein said vehicle further includes means for presenting the message within the vehicle.

30. A system as set forth in claim 28, wherein said vehicle further includes:
 means for generating a message acknowledgement signal; and
 means for transferring the message acknowledgement signal to said means for outputting the consumable energy source.

31. A method for delivering an unsolicited message to an occupant of a vehicle, comprising the steps of:

storing at least one message at a location that is external to a vehicle;

in response to the vehicle being coupled to a means for outputting a consumable energy source to the vehicle, transferring the stored at least one message to the vehicle through the outputting means;

receiving the transferred at least one message within the vehicle; and presenting the received message in human perceptible form.

32. A method for delivering an solicited message to an occupant of a vehicle, comprising the steps of:

coupling the vehicle to a means for outputting a consumable energy source to the vehicle;

operating a data entry means for generating a message solicitation request, the message solicitation request being transferred through the outputting means;

in response to the message solicitation request, transferring at least one solicited message to the vehicle through the outputting means;

receiving the transferred at least one solicited message within the vehicle; and presenting the received at least one solicited message in human perceptible form.

* * * * *